United States Patent [19]

Tanaka et al.

[11] Patent Number: 5,330,605
[45] Date of Patent: Jul. 19, 1994

[54] METHOD FOR PRODUCTION OF A COPOLYESTER RESIN FILM LAMINATED METAL SHEET

[75] Inventors: Atsuo Tanaka; Tetsuhiro Hanabusa, both of Tokuyama; Harunori Kojo, Yamaguchi; Tsuneo Inui, Tokuyama, all of Japan

[73] Assignee: Toyo Kohan Co., Ltd., Tokyo, Japan

[21] Appl. No.: 839,726

[22] Filed: Feb. 19, 1992

Related U.S. Application Data

[63] Continuation of Ser. No. 494,634, Mar. 16, 1990, abandoned.

[51] Int. Cl.$^5$ ............ B32B 31/08; B32B 31/20; B32B 31/26
[52] U.S. Cl. ............ 156/309.9; 156/321; 156/322; 156/324
[58] Field of Search ............ 156/321, 322, 324, 309.9, 156/332; 428/623, 626

[56] References Cited

U.S. PATENT DOCUMENTS

| | | | |
|---|---|---|---|
| 2,861,022 | 11/1958 | Lundsager | 156/322 |
| 3,647,592 | 3/1972 | Woodberry | 156/322 |
| 4,517,255 | 5/1985 | Kanda et al. | 156/322 |
| 4,614,691 | 9/1986 | Inui et al. | 156/322 |
| 4,677,188 | 6/1987 | Utsumi et al. | 264/176.1 |
| 4,698,195 | 10/1987 | Okumura et al. | 264/210.2 |
| 4,939,232 | 7/1990 | Fukuda et al. | 264/176.1 |
| 4,957,820 | 9/1990 | Heyes et al. | 156/69 |
| 5,059,460 | 10/1991 | Heyes et al. | 156/309.9 |
| 5,094,924 | 3/1992 | Matsui et al. | 428/626 |

FOREIGN PATENT DOCUMENTS

| | | |
|---|---|---|
| 0089826 | 5/1986 | Japan. |
| 2164899 | 4/1986 | United Kingdom. |

OTHER PUBLICATIONS

Abstract of Japanese Pat. Pub. No. SHO 60-47103 (w/example).
Abstract of Japanese Pat. Pub. No. Sho 61-149340 (w/example).
Abstract of Japanese Pat. Pub. No. Sho 61-149341 (w/example).
Abstract of Japanese Pat. Pub. No. Sho 63-13829 (w/example).
Abstract of Japanese Pat. Pub. No. Sho 59-46786 (w/example).
Nielsen, *Mechanical Properties of Polymers*, 1962, pp. 30–36, 216–219.
Kirk-Othmer, *Encyclopedia of Chemical Technology*, vol. 18, 1982, p. 552.
Roff, *Handbook of Common Polymers*, 1971, pp. 240–246.

Primary Examiner—Michael W. Ball
Assistant Examiner—Steven D. Maki
Attorney, Agent, or Firm—Felfe & Lynch

[57] ABSTRACT

A method for producing a copolyester resin film laminated metal sheet having an excellent heat resistance which comprises laminated a biaxially oriented copolyester resin film having specified characteristics on one or both sides of a metal sheet coated with a single layer of hydrated chromium oxide or a double layer consisting of a lower layer of metallic chromium and an upper layer to hydrated chromium oxide which has been heated to a temperature of Tm-50° C. to Tm, where Tm represents the melting temperature of said copolyester resin film.

This copolyester resin film laminated metal sheet is suitable for the materials for can stock which is reheated for curing the coated lacquer or treated with hot steam for sterilization of food after packing food in the cans, such as deeply drawn cans, drawn and redrawn cans, can ends, screwed caps and crown caps.

5 Claims, No Drawings

METHOD FOR PRODUCTION OF A COPOLYESTER RESIN FILM LAMINATED METAL SHEET

This application is a continuation of application Ser. No. 494,634, filed Mar. 16, 1990 now abandoned.

FIELD OF THE INVENTION

The present invention relates to a method for producing a copolyester resin film laminated metal sheet having an excellent heat resistance which comprises laminated a biaxially oriented copolyester resin film having specified characteristics on one or both sides of a metal sheet covered with a double layer consisting of a lower layer of metallic chromium and an upper layer of hydrated chromium, which has been heated to a temperature of Tm-50° C. to Tm (or 50° C. to Tm-4° C.), where Tm represents the melting temperature of said copolyester resin film.

BACKGROUND AND OBJECTIVE

At present, metal sheets such as electroinplate, tin free steel and aluminum sheet are widely used for can stock after coating with lacquer one or several times. The lacquer coating is disadvantageous from the standpoint of energy cost because a long time is required for curing the lacquer and a large volume of solvent discharged during lacquer curing must be burned in another furnace in order to prevent air pollution.

Recently, the lamination of thermoplastic resin film on a metal sheet was attempted in order to avoid these problems. For example, the methods shown in Japanese Patent Publication No. Sho 60-47103, Laid-Open Japanese Patent Application No. Sho 61-149340, Japanese Patent Publication No. Sho 63-13829, Laid-Open Japanese Patent Application No. Sho 61-149341 and Japanese Patent Publication No. Sho 59-46786 are already known.

Japanese Patent Publication No. Sho 60-47103 and Laid-Open Japanese Patent Application No. Sho 61-149340 relate to a process for lamination of a crystalline polyester resin film to a metal sheet by heating the sheet to above the melting point of said polyester resin film and thereafter immediately quenching the laminate. In these patents, the crystalline polyester resin film is sufficiently adhered to the metal sheet by an amorphous non-oriented polyester resin layer which is formed at the interface of the crystalline polyester resin film and the metal sheet as a result of the heating step. However, when the polyester resin film laminated metal sheet according to said patents is reheated to the temperature of 160° to 210° C. for 10 to 30 minutes required for curing the printing ink or lacquer coated on said metal sheet before forming, adhesion of the polyester resin film becomes noticeably poor. Furthermore, when the polyester resin film laminated metal sheet according to the above cited patents is treated by hot steam at 100° to 135° C. in a retort, the surface of the polyester resin film laminated metal sheet becomes milky. Especially, the part of the surface of said polyester resin film laminated metal sheet, where the hot water droplets pile up, becomes noticeably milky. The reasons for the deterioration of adhesion strength and the discoloration of the surface appearance described above are due to the recrystallization of the amorphous non-oriented polyester resin layer by reheating or by contact with hot steam.

On the other hand, the surface of the polyester resin film laminated metal sheet according to Japanese Patent Publication No. Sho 63-13829 and Laid-Open Japanese Patent Application No. Sho 61-149341 does not become milky by contact with hot steam in a retort, because an amorphous non-oriented polyester resin layer is not present as a result of lamination at a temperature below the melting point of said polyester resin film. However, the coating and curing of the specified adhesive which is indispensable in said patents is disadvantageous from the standpoint of production cost.

In Japanese Patent Publication No. Sho 59-46786, there is disclosed a process for laminating an oriented polyester sheet to metal by a simultaneous insertion of said polyester sheet and metal between a pair of rolls which is heated to a temperature below the melting point of said polyester sheet. However, the adhesion strength of the polyester sheet to the metal is remarkably poor as shown in the examples in the above patent because the polyester sheet is directly laminated to an untreated metal surface. Therefore, the laminate according to that patent is not applications where excellent adhesion of the laminated polyester film to a metal sheet is required even after forming i.e. to deep drawn cans and can ends.

Accordingly, it is a first objective of the present invention to provide a polyester resin film laminated metal sheet having excellent heat resistance wherein the laminated polyester resin film is not peeled off from the surface of the metal by forming even after reheating before forming and the surface appearance does not change after treatment by hot steam in a retort.

It is the second objective of the present invention to provide a method for the continuous lamination at high speed of polyester resin film on one or both sides of a metal sheet.

SUMMARY OF THE INVENTION

The first objective of the present invention can be accomplished by the lamination of a copolyester resin film selected by specified characteristics from the copolyester resin film which is produced by stretching and heat setting of the copolyester resin film consisting of 75 to 99 mole % of polyethylene terephthalate and 1 to 25 mole % of a polyester resin which is produced by esterification of at least one saturated polycarboxylic acid with at least one saturated polyalcohol directly on one or both sides of the covered metal sheet or strip with laminating rolls.

The second objective of the present invention can be accomplished by continuous laminating, at high speed, said copolyester resin film on one or both sides of a metal sheet heated to the temperature of Tm-50° C. to Tm, where Tm represents the melting temperature of said copolyester resin film.

The present invention is characterized by the following characteristics of the employed copolyester resin film:
(1) Melting temperature
(2) Density
(3) Planer orientation coefficient Furthermore, the present invention is also characterized by the following laminating conditions:
(1) Temperature of the metal sheet just before the lamination of said copolyester resin film
(2) Temperature of the employed laminating roller
(3) Use of the surface treated metal sheet The copolyester resin film laminated metal sheet having an excellent heat resistance according to the present invention can be obtained by controlling all of these factors described above in some optimum ranges.

The copolyester-resin-film laminated metal sheet according to the present invention can be used in applications wherein excellent heat resistance is required, such as deeply drawn cans, drawn and redrawn can, can ends, screwed caps and crown caps. In these applications, the cans and the can ends are exposed to hot steam at a temperature above 100° C. in a retort for sterilization after packing food such as coffee drink, meat or fish in the can.

In these applications, color printing ink or lacquer coating on one or both sides of the metal sheet used for the outside or inside of these cans and these can ends is often carried out before or after forming. In the use of the copolyester-resin-film laminated metal sheet according to the present invention to these applications, the laminated copolyester resin film is not peeled off in severely formed areas and is without the discoloration of the surface appearance even after reheating for curing color printing ink or lacquer and subsequent treatment by hot steam in a retort.

DETAILED DESCRIPTION OF THE INVENTION

In the present invention, the copolyester resin film having some specified characteristics is selected from the copolyester resin film prepared by processing according to known methods a copolyester resin consisting of 75 to 99 mole % of polyethylene terephthalate and 1 to 25 mole % of a polyester resin which is produced by the esterification of at least one saturated polycarboxylic acid with at least one saturated polyalcohol selected from the following polycarboxylic acids and polyalcohols.

Saturated polycarboxylic acids are selected from phthalic acid, isophthalic acid, terephthalic acid, succinic acid, azelaic acid, adipic acid, sebacic acid, diphenyl carboxylic acid, 2,6-naphthalene dicarboxylic acid, 1,4-cyclohexane dicarboxylic acid and trimellitic acid anhydride.

Saturated polyalcohols are selected from ethylene glycol, 1,4-butanediol, 1,5-pentanediol, 1,6-hexanediol, propylene glycol, polytetramethylene glycol, trimethylene glycol, triethylene glycol, neopenthyl glycol, trimethylene glycol, triethylene glycol, neopentyl glycol, 1,4-cyclohexane dimethanol, trimethylol propane and pentaerythritol.

Furthermore, in the present invention, the use of biaxially oriented copolyester resin film controlling all of the following factors in some optimum ranges is indispensable from the viewpoint of adhesion of said copolyester resin film to the metal sheet and heat resistance after forming to the cans and the can ends:

(1) Melting temperature of the employed copolyester resin film
(2) Density of the employed copolyester resin film
(3) Planer orientation coefficient of the employed copolyester resin film
(4) Temperature of the metal sheet just before the lamination of said copolyester resin film
(5) Temperature of rubber rollers used for the lamination of the copolyester resin film
(6) Use of the surface treated metal sheet.

In some cases, additives such as antioxidants, stabilizers, pigments, antistatic agents and corrosion inhibitors are added during the manufacturing process of the copolyester resin film used for the present invention.

The melting temperature of the employed copolyester resin film which is one of the important factors in the present invention is defined as the temperature at which the endothermic peak is obtained at a heating rate of 10° C./min. in the differential scanning calorimeter (SS10) for example as made by Seiko Denshi Kogyo Co. In the present invention, a copolyester resin film having a melting temperature of 200° to 250° C. should be used. The use of a copolyester resin film having a melting temperature above 250° C. is not suitable in the present invention because a large amount of an amorphous non-oriented copolyester resin layer is formed as the result of the lamination of copolyester resin film at above the melting temperature of said copolyester resin film in order to obtain the copolyester resin film laminated metal sheet having excellent adhesion to the metal sheet and corrosion resistance after forming. A copolyester resin film having a melting temperature below 200° C. is not practical for use because the lamination of said copolyester resin film at high speed is difficult, because the uniformity of said copolyester resin film is poor. Especially, the lamination of the copolyester resin film having a thickness below 10 μm is remarkably difficult.

The density of the employed copolyester resin film is also an important factor in the present invention. The density should be controlled in the range of 1.3500 to 1.4100 g/cc. When a metal sheet laminated by a copolyester resin film having a density below 1.3500 is reheated for curing printing ink or lacquer coated on one or both sides of said copolyester-resin-film laminated metal sheet and is subsequently treated by hot steam in a retort, the adhesion of the copolyester resin film to the metal sheet, corrosion resistance after forming to cans and can ends and surface appearance of the copolyester resin film laminated metal sheet becomes noticeably poor, because a large amount of noncrystalline parts contained in said copolyester resin film is recrystallized by reheating or by contact with hot steam.

On the other hand, the lamination of a copolyester resin film having a density above 1.4100 to a metal sheet at a temperature below the melting point of said copolyester resin film is difficult in practice, because the amount of noncrystalline parts contained in said copolyester resin film decreases markedly.

In the present invention, the planer orientation coefficient of the employed copolyester resin film is also one of the important factors. The planer orientation coefficient should be controlled in the range of 0.050 to 0.1600 from the viewpoint of adhesion of the copolyester resin film to the metal sheet, corrosion resistance after forming and the discoloration resistance of the surface appearance of the copolyester-resin-film laminated metal sheet by reheating or by treatment with hot steam. As shown in examples 1 through 5, the planar orientation coefficient is 0.1510 to 0.0668. This planer orientation coefficient which is defined as the degree of the orientation of polyester resin film is determined by using a refractometer and is shown by the following equation.

$$A = (B+C)/2 - D$$

where,

A represents the planer orientation coefficient of the polyester resin film,

B represents the refractive index in the lengthwise direction of the polyester resin film, C represents the refractive index in the widthwise direction of the polyester resin film, and D represents the refractive index in the thickness direction of the polyester resin film.

The use of a copolyester resin film having above 0.1600 of the planer orientation coefficient is not suitable in the present invention because such rigid copolyester resin films show poor formability. Furthermore, the lamination of said copolyester resin film to a metal sheet is difficult at a temperature below the melting temperature of the copolyester resin film. On the other hand, the formability of the metal sheet laminated with the copolyester resin film having a planer orientation coefficient below 0.050 is noticeably poor, because the copolyester resin film is easy to crystallize by reheating or retort treatment, and furthermore, the copolyester resin film is weakened in the mechanical properties by aging.

The thickness of the copolyester resin film used in the present invention should be 5 to 50 $\mu$m. If the thickness of the employed copolyester resin film is below 5 $\mu$m, good corrosion resistance after forming of the metal sheet according to the present invention is not obtained and the continuous lamination of thin copolyester resin film to the metal sheet becomes noticeably difficult. The use of copolyester resin film having a thickness above 50 $\mu$m is not economically suitable for the film to be laminated to the metal sheet, because the copolyester resin film used for the present invention is expensive as compared with epoxy phenolic lacquers widely used in the can industry.

In the present invention, the metal sheet should be selected from the group of steel sheet, aluminum sheet, tin plated steel sheet and nickel plated steel sheet which are covered on both sides with a double layer consisting of an upper layer of hydrated chromium oxide and a lower layer of metallic chromium.

The amount of plated tin and plated nickel in said metal sheet should be below 5.6 g/m$^2$ and 3.0 g/m$^2$, respectively, from the view point of economics. If the amount of plated tin and nickel is below 0.1 g/m$^2$ and below 0.05 g/m$^2$, respectively, the effect of plated tin and nickel on the characteristics is hardly apparent, despite the addition of a further plating process.

In the present invention, it is indispensable that said metal sheet is covered with a double layer consisting of a lower layer of metallic chromium and an upper layer of hydrated chromium oxide or a single layer of hydrated chromium oxide in order to obtain the excellent adhesion of the copolyester resin film to the metal sheet after forming to deep drawn cans and can ends.

The optimum amount of hydrated chromium oxide as chromium and metallic chromium is 5 to 30 mg/m$^2$ and 10 to 150 mg/m$^2$, respectively, in said double layer. If the amount of hydrated chromium oxide as chromium is below 5 mg/m$^2$ or above 30 mg/m$^2$, the adhesion of copolyester resin film to the metal sheet may become poor in a severe part, when the copolyester resin film laminated metal sheet is exposed to hot steam. If the amount of metallic chromium is below 10 mg/m$^2$, the adhesion of the copolyester resin film may also become poor, even if the amount of hydrated chromium oxide as chromium is 5 to 30 mg/m$^2$. The deposition of metallic chromium above 150 mg/m$^2$ is not suitable in the continuous production of the copolyester-resin-film laminated metal sheet according to the present invention at high speed, although the adhesion of said copolyester resin film does not becomes markedly poor.

The temperature of the metal sheet just before the lamination of the copolyester resin film, which is also one of the important factors in the present invention, should be maintained in the range of Tm-50° C. to Tm, where Tm represents the melting temperature of the copolyester resin film. As shown in examples 1 through 5, the temperature of the metal sheet is 178° C. to 225° C. If the temperature is below Tm-50° C., the copolyester resin film does not sufficiently adhere to the metal sheet, even if the surface temperature of the laminating rollers described below is controlled in some optimum range.

On the other hand, if the temperature of the metal sheet is above Tm, the characteristics such as corrosion resistance, adhesion of the copolyester resin film to the metal sheet and surface appearance become noticeably poor because the noncrystalline copolyester resin layer formed at the interface of biaxially oriented copolyester resin layer and metal sheet is recrystallized by reheating or retort treatment by hot steam.

In the present invention, the method for heating the metal sheet to which the copolyester resin film is laminated is not especially limited. However, from the continuous and stable production of metal sheet according to the present invention at high speed, conduction heating by a roller heated by induction heating, induction heating and/or resistance heating which are used for reflowing electrotinplate in the production process of electrotinplate is suitable as the method for heating the metal sheet, because the metal sheet can be rapidly heated and the temperature of the heated metal sheet can be easily controlled. Furthermore, it is also preferable in the present invention that heating by roller heated by hot steam or heating in an electric oven can be used as an auxiliary method for preheating the metal sheet to be laminated.

The surface temperature of the laminating roller is also one of the important factors in the present invention. The surface temperature of the laminating roller should be controlled in the range of Tm-150° C. to Tm-10° C. At below Tm-150° C., an air bubble occurs easily between the copolyester resin film and the metal sheet during the lamination of the copolyester resin film to the metal sheet, even if the temperature of the metal sheet, just before the lamination of the copolyester resin film, is maintained in the optimum range described above. Furthermore, the copolyester resin film laminated metal sheet having excellent adhesion to the metal sheet is not practically obtained at below Tm-150° C. If the temperature of the metal sheet is above Tm, the copolyester resin film laminated metal sheet having excellent adhesion to the metal sheet is obtained, even if the surface temperature of the laminating roller is below Tm-150° C. However, this method is not preferable because the characteristics of the copolyester resin film laminated metal sheet become remarkably poor by the formation of noncrystalline copolyester resin layer described above.

On the other hand, at a temperature of the laminating roller above Tm-10° C., the production of the metal sheet according to the present invention at high speed is prevented, because the copolyester resin film readily adheres to the laminating rollers. As the laminating rubber roller, a roller made with silicon rubber or fluorine rubber, which has excellent heat conductivity and heat resistance, should be selected.

A method for cooling after the lamination of copolyester resin film to the metal sheet is not limited to rapid cooling or gradual cooling, because the slight amount of the noncrystalline copolyester resin layer is only formed at the interface between biaxially oriented copolyester resin film and metal sheet and then the obtained characteristics do not change by both methods.

The present invention is explained in further detail by reference to the following examples.

It will be understood that the specification and examples are illustrative but not limitative of the present invention and that other embodiments within the spirit and scope of the invention will suggest themselves to those skilled in the art.

EXAMPLE 1

A cold rolled steel strip having a thickness of 0.21 mm and a width of 300 mm was electrolytically degreased in a solution of 70 g/l sodium hydroxide and then pickled in a solution of 100 g/l sulfuric acid. The steel strip, after being rinsed with water, was cathodically treated by using a an electrolyte consisting of 60 g/l of $CrO_3$ and 3 g/l of NaF in water under 20 $A/dm^2$ of cathodic current density at an electrolyte temperature of 50° C. The thus treated steel strip was rinsed with hot water having a temperature of 80° C. and dried.

After that, a biaxially oriented copolyester resin film having a thickness of 12 $\mu$m, which is produced by a condensation polymerization of ethylene glycol with terephthalic acid and isophthalic acid having the characteristics shown below in (A), was continuously laminated on both surfaces of the thus treated steel strip under the following conditions (B) show below.

(A) Characteristics of the employed copolyester resin film:
Thickness: 12 $\mu$m
Melting temperature: 229° C.
Density: 1.3869 g/cc
Planer orientation coefficient: 0.1011
(B) Conditions for lamination of the employed copolyester resin film:
Temperature of the metal strip just before lamination: 225° C.
Surface temperature of the employed rubber rollers: 170° C.
Material of the employed rubber rollers: Silicon rubber
Method for cooling after lamination: Gradual cooling

EXAMPLE 2

A biaxially oriented copolyester resin film produced by a condensation polymerization of ethylene glycol with terephthalic acid and azelaic acid having characteristics shown below in (A) was continuously laminated on both surfaces of the same treatment steel strip as in Example 1 under the following conditions (B) shown below (A) Characteristics of the employed copolyester resin film:
Thickness: 15 $\mu$m
Melting temperature: 240° C.
Density: 1.3991 g/cc
Planer orientation coefficient: 0.1510
(B) Conditions for lamination of the employed copolyester resin film:
Temperature of the metal strip just before lamination: 210° C.
Surface temperature of the employed rubber rollers: 170° C.
Material of the employed rubber rollers: Silicon rubber
Method for cooling after lamination: Gradual cooling

EXAMPLE 3

The same steel strip pretreated as in Example 1 was electroplated with tin by using an electrolyte containing 80 g/l of $SnSO_4$, 60 g/l of phenolsulfonic acid (60% aqueous solution) and 5 g/l of ethoxylated e-naphthol sulfonic acid in water under 15 $A/dm^2$ of cathodic current density at an electrolyte temperature of 40° C. After reflowing of tin and rinsing with water, the tin plated steel strip was treated by using an electrolyte containing 30 g/l of $CrO_3$ and 0.3 g/l of $H_2SO_4$ in water under 40 $A/dm^2$ of cathodic current density at an electrolyte temperature of 50° C. The thus treated electrotinplate was rinsed with water and dried.

After that, a biaxially oriented copolyester resin film produced by a condensation polymerization of ethylene glycol with terephthalic acid and sebacic acid having characteristics shown in (A) below was continuously laminated on both surfaces of thus treated steel strip under the following conditions (B).

(A) Characteristics of the employed copolyester resin film:
Thickness: 16 $\mu$m
Melting temperature: 220° C.
Density: 1.3854 g/cc
Planer orientation coefficient: 0.1008
(B) Conditions for lamination of the employed copolyester resin film:
Temperature of the metal strip just before lamination: 195° C.
Surface temperature of the employed rubber rollers: 150° C.
Material of the employed rubber rollers: Silicon rubber
Method for the cooling after lamination: Rapid cooling

EXAMPLE 4

The same steel strip pretreated as in Example 1 was electroplated with 0.6 $g/m^2$ of nickel by using a Watt's bath containing 250 g/l of $NiSO_4.6H_2O$, 40 g/l of $NiCl_2.6H_2O$ and 40 g/l of $H_3BO_3$ in water under 10 $A/dm^2$ of cathodic current density at an bath temperature of 45° C. After rinsing with water, the nickel plated steel strip was treated by using an electrolyte containing 80 g/l of $CrO_3$, 1.0 g/l of $HBF_4$ and 0.2 g/l of $H_2SO_4$ in water under 40 $A/dm^2$ of cathodic current density at an electrolyte temperature of 55° C. The thus treated steel strip was rinsed with water and dried.

After that, a biaxially oriented copolyester resin film produced by a condensation polymerization of ethylene glycol with terephthalic acid and isophthalic acid having the characteristics shown below in (A) was continuously laminated on both surfaces of thus treated steel strip under the following conditions (B) shown below.

(A) Characteristics of the employed copolyester resin film:
Thickness: 16 $\mu$m
Melting temperature: 211° C.
Density: 1.3721 g/cc
Planer orientation coefficient: 0.0668
(B) Conditions for lamination of the employed copolyester resin film:

Temperature of the metal strip just before lamination: 178° C.
Surface temperature of the employed rubber rollers: 105° C.
Material of the laminating rollers: Silicon rubber
Method for cooling after lamination: Gradual cooling

EXAMPLE 5

An aluminum strip (JIS 3004) having a thickness of 0.23 mm was cathodically degreased in a solution of 30 g/l sodium carbonate. After being rinsed with water, the aluminum strip was treated by using the same electrolyte as in Example 1 under the same condition as in Example 1.

After that, the same biaxially oriented copolyester resin film as shown in (A) in Example 1 was continuously laminated on both surfaces of thus treated aluminum strip under the same conditions as in (B) of Example 1.

COMPARATIVE EXAMPLE 1

A biaxially oriented polyester resin film produced by a condensation polymerization of ethylene glycol with terephthalic acid having characteristics shown in (A) was continuously laminated on both surfaces of the same treated steel strip as in Example 1 under the same conditions (B) as in Example 1.

(A) Characteristics of the employed polyester resin film:
Thickness: 12 μm
Melting temperature: 258° C.
Density: 1.4041 g/cc
Planer orientation coefficient: 0.1670

COMPARATIVE EXAMPLE 2

The same copolyester resin film as in Example 1 was continuously laminated on both surfaces of the same treated steel strip as in Example 1 under the following conditions (B).

(B) Conditions for the lamination of the employed copolyester resin film:
Temperature of the metal strip just before lamination: 242° C.
Surface temperature of the employed rubber rollers: 180° C.
Material of the laminating rollers: Silicon rubber
Method for cooling after lamination: Gradual cooling

COMPARATIVE EXAMPLE 3

The same copolyester resin film as in Example 4 was continuously laminated on both surfaces of the same treated steel strip as in Example 4 under the following conditions (B).

(B) Conditions for lamination of the employed copolyester resin film:
Temperature of the metal strip just before lamination: 260° C.
Surface temperature of the employed rubber rollers: 60° C.
Material of the laminating rollers: Silicon rubber
Method for cooling after lamination: Rapid cooling The adhesion of the laminated polyester resin film to the metal sheet and the heat resistance of the resultant metal sheet were evaluated by the following testing methods, after the measurement of the coating weight on the resultant metal sheet by an X-ray fluorescent method. The results are shown in the Table.

(1) Adhesion of the Laminated Polyester Resin Film to the Metal Sheet After Forming The resultant metal sheet was cut to a circular blank having a diameter of 96 mm by a punch press. The blank was deeply drawn to form a cup at a drawing ratio of 2.36. The adhesion of the laminated copolyester resin film to the metal sheet was evaluated by the degree of the peeling off of the polyester resin film in the formed area and then divided into 5 ranks, wherein 5 was excellent, 4 was good, 3 was fair, 2 was poor and 1 was bad.

(2) Heat Resistance By Reheating

The resultant metal sheet which was cut to a size of 100 mm×50 mm was heated at 200° C. for 10 minute in an electric oven. After that, the degree of the discoloration in the surface appearance of the sample was evaluated with the naked eye and then divided into 5 ranks, wherein 5 was excellent (no discoloration), 4 was good, 3 was fair, 2 was poor and 1 was bad (remarkably milky).

(3) Heat Resistance By The Treatment In A Retort

The resultant metal sheet which was cut to a size of 100 mm×50 mm was treated by hot steam having a temperature of 120° C. for 1 hour in a retort. After that, the degree of the discoloration in the surface appearance of the sample was evaluated with the naked eye and then divided into 5 ranks, wherein 5 was excellent (no discoloration), 4 was good, 3 was fair, 2 was poor and 1 was bad (remarkably milky).

TABLE

| | Ex. 1 | Ex. 2 | Ex. 3 | Ex. 4 | Ex. 5 | Comp. Ex. 1 | Comp. Ex. 2 | Comp. Ex. 3 |
|---|---|---|---|---|---|---|---|---|
| Metal sheet | | | | | | | | |
| Base metal | Steel | Steel | Steel | Steel | Al | Steel | Steel | Steel |
| Coating weight (g/m²) | $Cr^o$ 0.120 $Cr^{ox}$ 0.015 | $Cr^o$ 0.120 $Cr^{ox}$ 0.015 | Sn 0.30 $Cr^o$ 0.030 $Cr^{ox}$ 0.013 | Ni 0.60 $Cr^o$ 0.075 $Cr^{ox}$ 0.010 | $Cr^o$ 0.025 $Cr^{ox}$ 0.008 | $Cr^o$ 0.120 $Cr^{ox}$ 0.015 | $Cr^o$ 0.120 $Cr^{ox}$ 0.015 | Ni 0.60 $Cr^o$ 0.075 $Cr^{ox}$ 0.008 |
| Characteristics of copolyester resin film | | | | | | | | |
| Thickness (μm) | 12 | 15 | 16 | 16 | 12 | 12 | 12 | 16 |
| Melt. temp. (°C.) | 229 | 240 | 220 | 211 | 229 | 258 | 229 | 211 |
| Density | 1.3869 | 1.3991 | 1.3854 | 1.3721 | 1.3869 | 1.4041 | 1.3869 | 1.3721 |
| POC | 0.1011 | 0.1510 | 0.1008 | 0.0668 | 0.1011 | 0.1670 | 0.1011 | 0.0668 |
| Laminating conditions | | | | | | | | |
| Temp. of metal | 225° C. | 210° C. | 195° C. | 178° C. | 225° C. | 225° C. | 242° C. | 260° C. |
| Temp. of Roller | 170° C. | 170° C. | 150° C. | 105° C. | 170° C. | 170° C. | 180° C. | 60° C. |
| Properties of samples | | | | | | | | |

TABLE-continued

|  | Ex. 1 | Ex. 2 | Ex. 3 | Ex. 4 | Ex. 5 | Comp. Ex. 1 | Comp. Ex. 2 | Comp. Ex. 3 |
| --- | --- | --- | --- | --- | --- | --- | --- | --- |
| Adhesion of polyester film | 5 | 5 | 4 | 5 | 5 | 1 | 5 | 5 |
| Heat resist. by heating | 5 | 5 | 5 | 5 | 5 | — | 3 | 2 |
| Heat resist. by hot steam | 5 | 5 | 5 | 5 | 5 | — | 2 | 1 |

Remarks:
*1 POC represents the planer orientation coefficient of polyester resin film.
*2 $Cr^o$ represents metallic Cr and $Cr^{ox}$ represents Cr in hydrated Cr oxide.

What is claimed is:

1. A method for producing a metal sheet or strip laminated with a biaxially oriented copolyester resin film comprising essentially of the steps of heating a metal sheet or strip having both sides covered with a double layer consisting of a lower layer of metallic chromium and an upper layer of hydrated chromium oxide to a temperature of Tm-50° C. to Tm-4° C. and laminating a 5-50 μm thick biaxially oriented copolyester resin film having a melting temperature of $T_m$, a density of 1.3500 to 1.4100 g/cc, and a planar orientation coefficient of 0.0668-0.1510 directly onto both sides of said covered metal sheet or strip with laminating rolls having a surface temperature of Tm-150° to Tm-10° C., and wherein Tm is 200° C.-250° C. and wherein the copolyester resin consists essentially of 75 to 99 mol % of polyethylene terephthalate and 1 to 25 mole % of a polyester resin which is produced by the esterification of at least one saturated polycarboxylic acid selected from the group consisting of phthalic acid, isophthalic acid, terephthalic acid, succinic acid, azelaic acid, adipic acid, sebacic acid, diphenylcarboxylic acid, 2,6-naphthalene dicarboxylic acid, 1,4-cyclohexane dicarboxylic acid and trimellitic acid anhydride with at least one saturated polyalcohol selected from the group consisting of ethylene glycol, 1,4-butanediol, 1,5-pentanediol, 1,6-hexanediol, propylene glycol, polytetramethylene glycol, trimethylene glycol, triethylene glycol, neopentyl glycol, 1,4-cyclohexane dimethanol, trimethylol propane and pentaerythritol.

2. The method of claim 1 wherein said metal sheet or strip, which is covered on both sides with said double layer, is steel, tin plated steel, nickel plated steel or aluminum.

3. The method of claim 2 wherein said metal sheet or strip, which is covered on both sides with said double layer, is tin plated steel or nickel plated steel and the amount of tin and nickel in said tin plated steel and said nickel plated steel is about 0.10 to 5.6 g/m² and about 0.50 to 3.0 g/m², respectively.

4. The method of claim 1, wherein the amount of hydrated chromium oxide as chromium is about 5 to 30 mg/m² and the amount of metallic chromium is about 10 to 150 mg/m².

5. The method of claim 8 wherein the temperature of the covered metal sheet or strip is 178° to 225° C.

* * * * *